3,550,470
REMOTE CONTROLLED MIRROR
John C. Brighton and George E. Scheitlin, Columbus, Ind., assignors to Arvin Industries, Inc., Columbus, Ind., a corporation of Indiana
Filed June 23, 1969, Ser. No. 835,451
Int. Cl. F16c 1/12
U.S. Cl. 74—501                                14 Claims

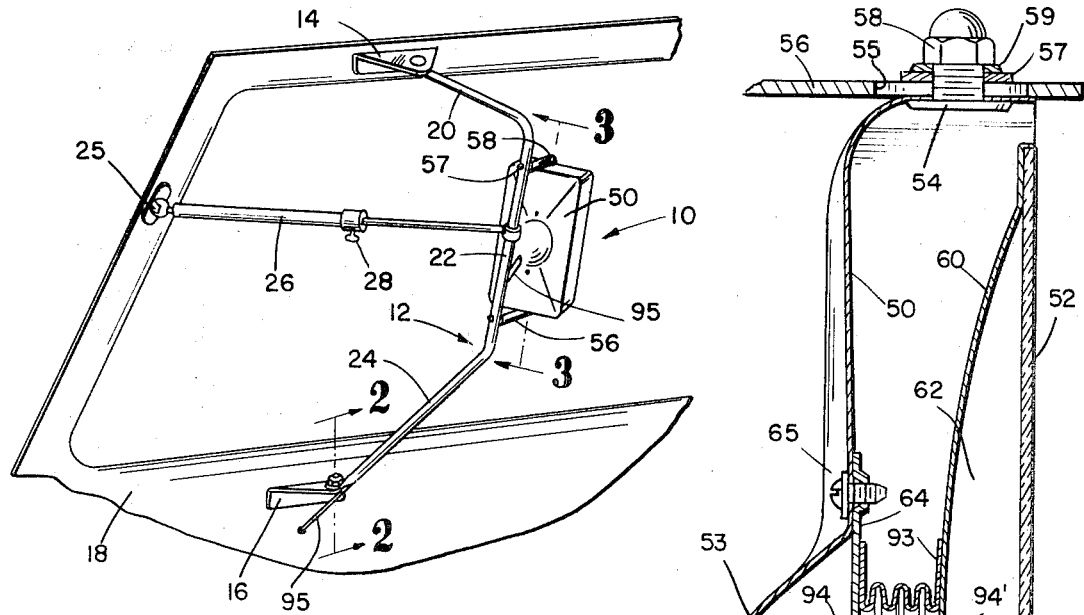
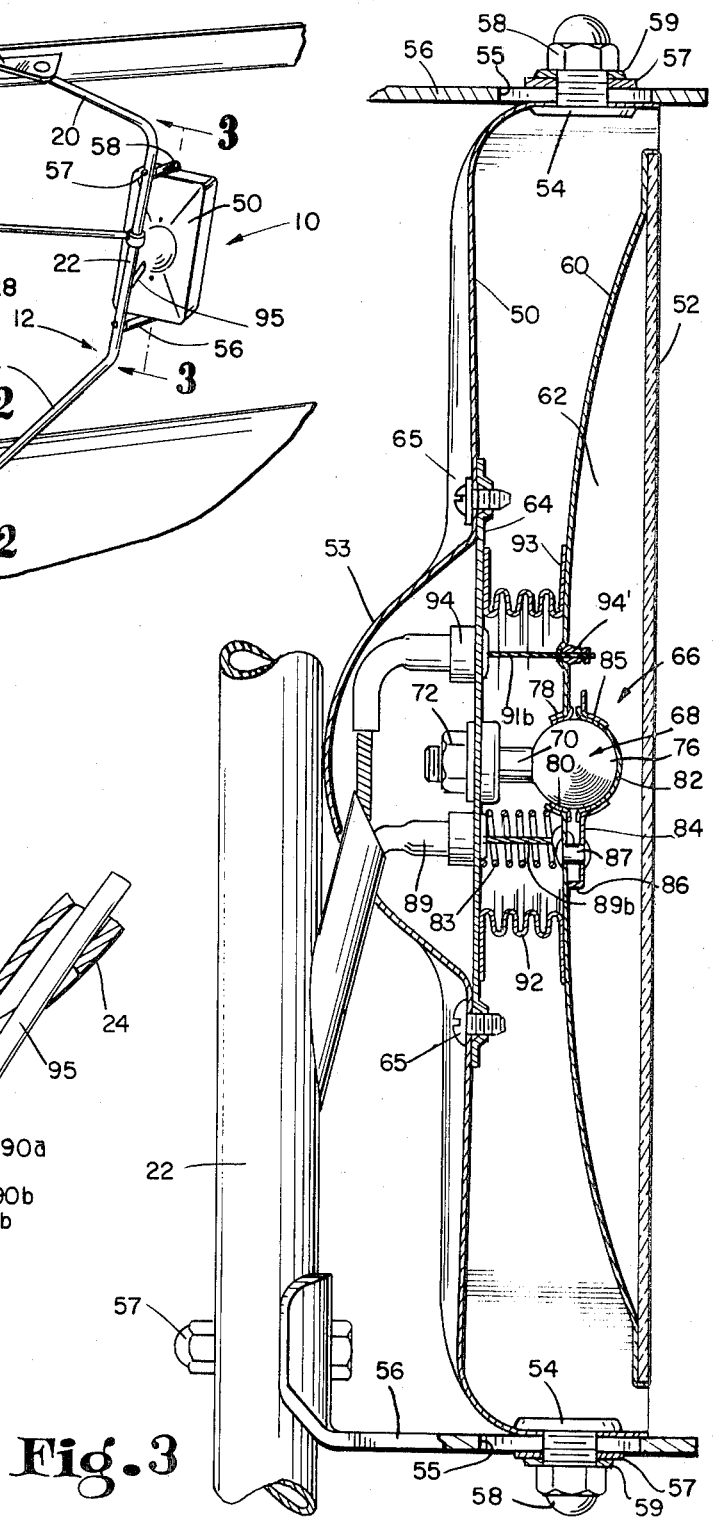
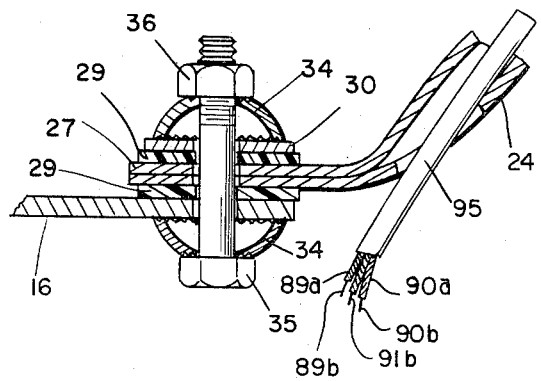
Fig. 1
Fig. 2
Fig. 3
INVENTORS
JOHN C. BRIGHTON
GEORGE E. SCHEITLIN
BY
ATTORNEYS

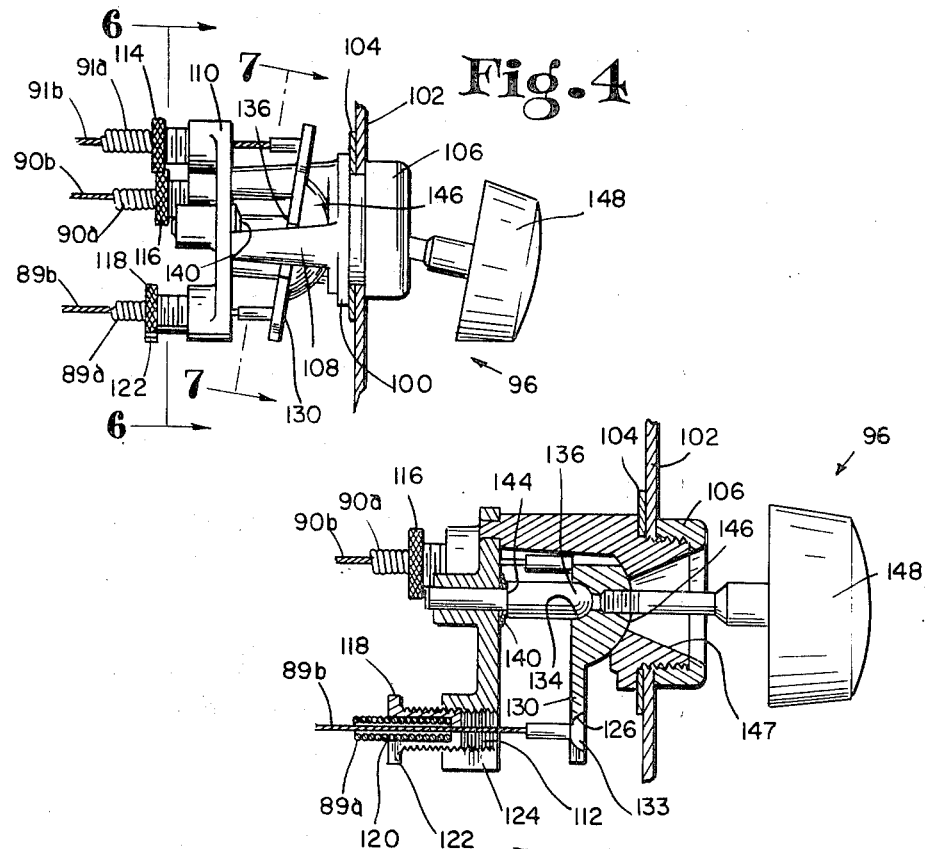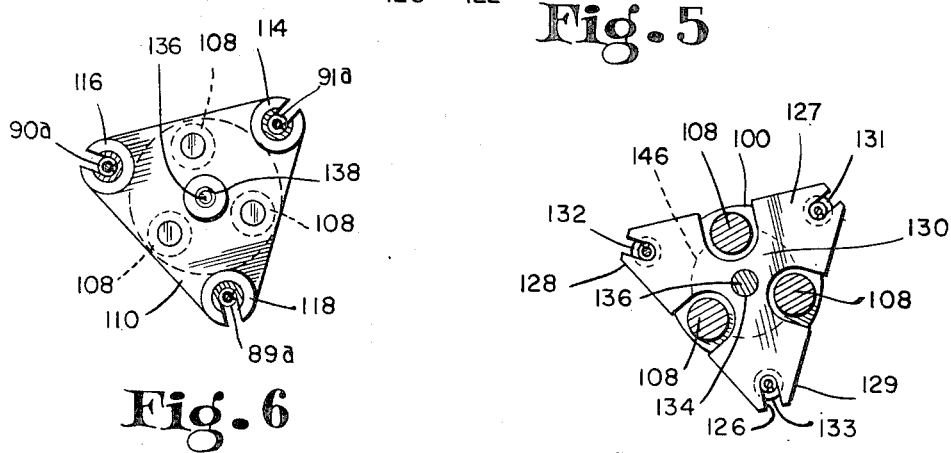

ABSTRACT OF THE DISCLOSURE

An adjustable outside rear view mirror for an automotive vehicle having remote control means therein for adjusting the position of the mirror. The mirror is adjustable with respect to a streamlining cover mounted on a frame adjustably mounted on the vehicle. The mirror is attached to said cover with a ball joint enclosed by a bellows for shielding the ball joint and for damping out vibrations. Remote control is effected by cables which pass from their connections to the mirror through the tubular frame for attachment to a control member by adjustable retaining members which permit easy and accurate adjustment of the cable lengths.

BACKGROUND OF THE INVENTION

Remotely controlled rear view mirrors, although known in the art as shown by our U.S. Pat. No. 3,369,427, have somewhat different and more rugged requirements when used on trucks rather than on passenger cars. For example, the rear view mirror on a truck is commonly held in a frame on the exterior of the truck and pivotable to move the mirror inwardly or outwardly from the side of the cab to a position determined by the width of the truck body and the preference of the driver. Thus, the control cables must be much longer for trucks than for cars and the requirements for their particular lengths may vary from one mirror to the next and from one truck to the next. The rear view mirror on a truck must also withstand a greater vibration than that of a passenger car because the suspension system of a truck is designed in a more rugged manner to sustain its extra weight.

Therefore, it is an object of this invention to provide an outside, rear view truck mirror whose coarse position of adjustment can be effected by its supporting frame's adjustment, and whose fine adjustment can be controlled from within the vehicle by a plurality of cables. It is a further object to provide convenient connecting means between said cables and cable control means in the vehicle so that the cable lengths may be easily adjusted as the assembly is assembled. It is still a further object to provide such mirror assembly which is mounted in a manner to withstand severe vibration without shifting from its desired position of adjustment.

SUMMARY OF THE INVENTION

In accordance with one embodiment of the invention there is provided a remotely controlled outside rear view mirror for an automotive vehicle. The mirror is partially enclosed in a streamlining cover which protects the mirror and prevents its positioning from being excessively affected by wind forces. The cover is movably mounted on a tubular frame which in turn is adjustably mounted on the vehicle. Therefore, coarse adjustments of the mirror may be made by manually moving the cover and/or the frame. The connections between the cover and frame, and the frame and vehicle, are made by a specific combination of washers and locking nuts and a telescoping brace which provide a rigid structure requiring a firm and positive adjusting force. Therefore, the structure will remain in place regardless of wind or vibrational forces.

The mirror is attached to the cover by a rearwardly projecting ball joint connection. The ball, which is fixedly interconnected to the cover, is partially enclosed in a bearing on the mirror in a configuration which requires a firm but even torque for movement. The ball and its bearing are enclosed in a bellows type structure extending between the cover and the back of the mirror. The bellows shields the ball joint against the weather and various contaminates, but, more importantly, it also provides a damping effect on vibrational forces.

Fine adjustment of the positioning of the mriror is effected by swiveling the mirror about the ball joint. To this end, a plurality of cables are attached at their outer ends to the back of the mirror and extend through the tubular frame to the inside of the vehicle for attachment at their inner ends to a cable control member. The control member comprises a base member fixedly mounted on the interior of the vehicle and carrying a manually movable plate connected to the inner ends of said cables and to a control handle. The handle protrudes from a spherically shaped surface on the plate, and said spherically shaped surface is spring biased against, and moves in, a corresponding spherically shaped fixed seat on the base member so that the handle is bindingly retained in the position in which it is placed. Each of said cables is carried in an outer cable connected at its outer end to said cover and at its inner end to said base member. Said inner ends of the outer cables are fixedly held in screws which are threaded into the base member, and which can be adjusted to adjust the lengths of said inner and outer cables from one application to the next, thereby permitting the mirror and control handle to be accurately centered between their limits of movement.

BRIEF DESCRIPTION OF THE DRAWINGS

The accompanying drawings illustrate the invention. In such drawings:

FIG. 1 is a perspective view showing a remotely controlled mirror assembly embodying the invention;

FIG. 2 is an enlarged sectional view taken along the line 2—2 of FIG. 1;

FIG. 3 is an enlarged sectional view taken along the line 3—3 of FIG. 1;

FIG. 4 is a side elevation of the control means for the mirror shown in FIG. 3;

FIG. 5 is an enlarged longitudinal section through the control means shown in FIG. 4;

FIG. 6 is a sectional view taken along line 6—6 of FIG. 4; and

FIG. 7 is a sectional view taken along the line 7—7 of FIG. 4.

DETAILED DESCRIPTION OF THE PREFERRED EMBODIMENT

In the embodiment of the invention shown in FIG. 1, a remotely controlled mirror assembly 10 is mounted on a tubular frame 12 which is swingably attached to brackets 14 and 16 on the door 18 of a truck. The frame 12 extends substantially horizontally, as at 20, away from its pivotal connection to the upper bracket 14, which is fixedly attached to the upper portion of the door 18, thence downwardly to form a substantially vertical stretch 22, and thence angularly downwardly and inwardly, as at 24, to its pivotal connection with the lower bracket 16 fixed to the door 18 below the window. A telescoping auxiliary brace 26 is swingably attached at its ends to the forward portion of the door 18 and to the center of the vertical portion 22 of the frame 12 as by brackets 25.

The brace 26 is provided with a set screw 28 for releasably locking it in the desired position of telescopic adjustment, and thereby preventing swinging movement of the frame 12 after it has been properly positioned. The brace 26, in addition to releasably locking the frame in position, also helps to brace the frame 12 against wind and vibrational forces.

The pivotal connections between the frame 12 and the brackets 14 and 16 are identical in construction, the connection to bracket 16 being shown in FIG. 2. As shown, the frame stretch 24 is flattened at 27 and is sandwiched between a pair of substantially friction free washers 29, one of which is in bearing engagement with the bracket 16 and the other of which is in engagement with a flat washer 30. A pair of dome shaped lock washers 34 each having sets of teeth on its inwardly and outwardly presented faces, are disposed against the outwardly presented faces of the washer 30 and bracket 16. The entire connection assembly is held in place by a bolt 35 passing through aligned openings in the assembly and received in a nut 36.

In this type of adjustable frame-to-truck mounting, it is common place for the nut and bolt assembly to loosen when the frame is adjusted. However, in the assembly described above and shown in FIG. 2, the nut and bolt connection will not loosen even if it is subjected to a very high torque. The frame member 24 however, is free to move about the axis of the bolts 35 between the washers 29 with a manually applied force. Therefore, the position of the mirror assembly 10 may be manually adjusted by loosening the set screw 28 on the brace arm 26, and adjusting the position of the frame 12 by rotating the ends of the frame members 20 and 24 in the brackets 14 and 16 while adjusting the length of the telescoping brace arm 26. When the frame is properly positioned, the set screw 28 is tightened and the frame is thereby held in a stationary position regardless of wind or vibrational forces. Said mounting assembly, shown in FIG. 1, also permits the mirror to be swung inwardly against the cab as for clearance in close quarters, automatic car washing machines, and the like.

The mirror assembly 10, as shown in FIG. 3 comprises a rearwardly open, streamlined cover 50, which shields a mirror 52 against wind forces and which is provided with a rearwardly open, forwardly projecting recess 53. Threaded studs 54 are welded to the upper and lower ends of the cover 50 and project therefrom through elongated slots 55 formed in rearwardly extending brackets 56 mounted, as by bolts 57, on the vertical frame stretch 22. Nuts 58, washers 51 and lockwashers 59 secure the brackets 56 to the studs 54 to lock the mirror cover 50 in place with relation to the frame 12. As will be understood, coarse adjustments of the position of the cover 50, and thus the mirror 52, with respect to the frame 12 can be made before tightening the nuts 58.

The mirror 52 is held in the rearwardly open face of a shell or carrier 60 having a forwardly dished central cavity 62 and secured to the mirror about its periphery. The carrier 60 is movably attached by a ball joint 66 to a plate 64 mounted on the inner face of the cover 50 by screws 65. The joint 66 is formed by a ball-stud 68 having its shank 70 attached to the plate 64 by a nut 72 carried in the cover recess 53. Conveniently, the shank 70 and the opening in the plate opening through which it extends have mating angularly disposed faces to prevent said shank from rotating in said opening. The ball 76 of the ball-stud 68 is received in an opening in the carrier 60 and is rotatably supported in a semi-spherically shaped seat 78 formed around said opening. Conveniently, a first bearing 80 is interposed between said seat and ball. A second bearing 82 opposes the first bearing 80 and is supported against the rearward face of the ball 76 by a retainer 84 having a semi-spherical surface 85 engaging said bearing. Legs 86 extend from the end of the retainer 84 and are riveted, as at 87, to the carrier 60. Said retainer 84 is made of a springable metal and acts in combination with a pair of coil springs 83 connected to the opposing faces of the plate 64 and carrier 60 on opposite sides of the legs 86 to provide a smooth and uniform torque response regardless of the direction of the movement of the carrier about the ball joint 66. This structure is unique and its function is distinguished from prior systems in that it is designed to operate under very slight torques in contrast to the prior systems which were purposely designed with high torque requirements.

After the frame 12 and mirror cover 50 have been properly positioned, and locked in place relative to the door 18 of the truck, finer adjustments of the mirror are made by moving the carrier on the ball-stud. Such movement is effected by three pairs or sets of coaxial cables 89, 90 and 91, the mirror or outer ends of the outer cables 89a, 90a and 91a being fixed to the plate 64 by means of retaining rivets 94, and the mirror or outer ends of the inner cables 89b, 90b, and 91b being releasably engageable with the carrier 60. Said inner cables pass through holes in the carrier and have their ends retained in a crimped ferrule 94' swivelly carried in the rounded sockets of the carrier to enable them to exert a pulling, but not a pushing, force on the carrier 60. One pair of said inner cables extend through the coil springs 83 for engagement with the carrier 60 on opposing sides of the retainer legs 86 and the third cable engages the carrier on the side of the ball joint 66 opposite said legs. Thus, the carrier 60 is rotatably movable on the ball joint 66 by pulling forces exerted by one or more of the inner cables 89b, 90b, and 91b from their arcuately spaced points of engagement with said carrier, said points being arcuately spaced about the axis of the ball joint. The springs 83 counterbalance the mirror and carrier so that the potential energy in said springs help the single top cable 91b lift the weight of the carrier and mirror.

The ball joint 66, the coil springs 83, and the connections between the inner cables and carrier 60 are all enclosed in a flexible accordian-like cylindrical bellows 92 having outwardly flanged ends 93 connected to the plate 64 and carrier 60, and having circumferential corrugations 94 formed continuously between its two ends. The bellows shields the ball joint and its adjacent cable connections against various contaminants which may impede the adjustability of the device. More importantly, however, the bellows 92, which is attached at its ends 93 to the plate 64 and carrier 60, serves to dampen out vibrations which would otherwise be transmitted to the mirror 52 and carrier 60 by the ball joint 66. That is, the bellows functions as a compression and expansion column to dampen the impulses of vibration.

The cables 89, 90, and 91 are carried in a conduit 95 extending outwardly from an opening in the cover recess 53 and into and through the frame 12. The inner end of said conduit extends through the door 18 to the cab of the truck and the inner ends of said cables are connected to a control member 96 mounted in the cab. As will be understood, said conduit protects the cables from exposed weathering and reinforces and protects the bends of the cables to help protect the outer cables against rupturing.

The control member 96 is shown in FIGS. 4, 5 and 6, and comprises a base 100 mountable in an opening in the vehicle door or dash panel 102 by a washer 104 and nut 106. The base 100 has a plurality of forwardly projecting arms 108 connected to a guide plate 110. Said guide plate 110 is provided with three arcuately spaced threaded openings 112, for receiving cable retainers in the form of adjusting screws 114, 116 and 118. The adjusting screws are recessed, as at 120, to receive the outer cables 89a, 90a and 91a, and each of said screws has an axial slot 122 cooperating with a slot 124 in its associated openings 112 so that the inner cables 89b, 90b, and 91b can project freely therethrough. Said inner cables extend through openings 126 formed in arms 127, 128 and 129 on an actuator 130. The ends of said inner cables have ferrules 131, 132 and 133 mounted thereon with the ends of said ferrules being swively carried in rounded sockets in the openings 126. The arms 127, 128 and 129 are angularly spaced on the actuator 130 to correspond to the angular spacing between the connections of the inner cables to the carrier 60. The forward face of the actuator is provided with a semi-spherical recess 134 which is pivotally received on the head of a shouldered pin 136 projecting forwardly from the actuator 130 and slidably received in an opening 138 provided in the guide plate 110. A spring 140 is carried on the pin 136 with its opposed ends bearing against the guide plate 110 and a pin shoulder 144 to thus urge the actuator away from the guide plate 110. The rearward face of the actuator 130 is also semi-spherically shaped, as at 146, and is slidably carried against a correspondingly shaped face on the base 100 under the force of the spring 140 to thus permit tilting movement of the actuator. A frusto-conical opening 147 is formed in the rearward face of the base 100 for the reception of a handle 148 connected to the rearward face of the actuator 130, whereby said handle is movable to swively move the actuator 130 with respect to the base 100. Such swivel movement causes the various inner cables 89b, 90b, and 91b to pull on the carrier 60 to create a corresponding swivel movement of the mirror 52, thereby remotely controlling positioning of said mirror. Conveniently, the adjusting cables are installed in the adjusting screws in a criss-cross fashion so that mirror movement follows the movement of the handle 148 in like directions.

The frame 12 may be placed in different positions on various trucks, and therefore the required cable lengths may change from one truck to the next. Furthermore, when assembling the system, it is necessary to determine precisely the cable lengths required to simultaneously center the mirror 52 and the handle 148 with respect to their limits of movement, so that maximum adjusting movements can be transmitted to the mirror. The adjusting screws 114, 116 and 118, permit the adjustment of the cable lengths to obtain said simultaneously centered conditions of the mirror and handle. That is, after the frame and mirror assembly 12 and 10 have been attached to the door 18 and the cables 89, 90, and 91 have been routed through the frame and into the cab, the adjusting screws 114, 116 and 118 are fully seated in their openings 112 and the cables are inserted one at a time. The actuator handle 148 is moved toward the first cable 89 and the ferrule 131 attached to the inner cable 89b is seated in the rounded socket of the opening 126. While the actuator handle 148 is held toward the adjusting screw 118, said screw is then turned out to partially withdraw it from the guide plate 110 until the slack in cable 89 is taken up. This procedure is repeated with respect to the other two cables 90 and 91, and then, if necessary, the three adjusting screws 114, 116, and 118 are readjusted until the actuator handle 148 and the mirror 52 are simultaneously centered. Thus, the control means structure alleviates the need to disassemble the cables from the actuator when it is necessary to make slight changes in their lengths.

We claim:

1. A remote control outside rear view mirror assembly mounted on a vehicle, comprising a rearwardly open cover, a mirro swively supported in said cover, a frame mounted on said vehicle for supporting the cover, said frame being U-shaped and having its ends swingably connected to brackets on the vehicle, a telescoping brace arm having its ends swingably attached to the frame and the vehicle, locking means on said arms for releasably retaining it in the desired position of adjustment, control means in said vehicle, and a plurality of cables interconnecting said mirror and control means for swivelling said mirror in said cover upon actuation of said control means.

2. The invention as set forth in claim 1 in which each of said swivel connections between the frame and brackets comprises a pair of friction free first washers disposed on opposite sides of said frame, one of said first washers in bearing engagement with said bracket and the other of said first washers in bearing engagement with a third washer, a pair of lock washers engaging said third washer and bracket, and having teeth on their inwardly and outwardly presented faces, and a bolt extending through aligned openings in said bracket, frame, washers and lock washers for reception in a nut.

3. The invention as set forth in claim 1 in which said frame is formed of tubular stock and the cables extend through said frame and cover from the mirror to the control means.

4. The invention as set forth in claim 1 with the addition that a mirror carrier is attached to the front side of the mirror, said carrier being swively interconnected to the cover by a ball joint comprising a ball-stud interconnected to the cover, bearing means on the carrier engaging the ball, and a circumferentially corrugated shield extending between said cover and carrier around said ball-stud.

5. A remote control outside rear view mirror assembly, comprising a frame swingably connected to the outside of a vehicle, adjustable brace means swingably connected to said frame and vehicle for releasably retaining said frame in the desired position of adjustment with respect to said vehicle, bracket means mounted on said frame, a rearwardly open cover operatively swingably connected to said brackets, a mirror mounted in said cover for movement with and with respect to said cover, control means mounted in said vehicle, and a plurality of cables interconnected to said mirror and control means for moving said mirror with respect to said cover upon actuation of said control means.

6. The invention as set forth in claim 5 in which said frame is tubular and said cables are carried in a conduit extending through said frame.

7. A remote control outside rear view mirror assembly mounted on a vehicle, comprising a rearwardly open cover, a frame mounted on said vehicle for supporting said cover, a ball-stud mounted in said cover, a carrier connected to a mirror and having means for swivelly mounting said carrier on said ball-stud, a plurality of springs arcuately spaced from said ball-stud, and bearing against said cover and carrier, flexible conduit means extending around said springs and ball-stud and between said carrier and cover, and a plurality of cables connected to said carrier and to control means mounted in said vehicle, said control means being movable to effect selective movement of said cables for moving said mirror with respect to said cover.

8. The invention as set forth in claim 7 in which said cables comprise pairs of coaxial cables, the outer cable in each such pair having its ends connected to said cover and control means, and the inner cable in each such pair having one of its ends connected to said control means and its opposite end projecting through said cover and connected to said carrier.

9. A remote control outside rear view mirror assembly for mounting on a vehicle, comprising a rearwardly open cover, a frame mounted on said vehicle for supporting said cover, a ball-stud mounted in said cover, a carrier connected to a mirror and having means for swivelly mounting said carrier on said ball-stud, a plurality of springs arcuately spaced from said ball-stud and bearing against said cover and carrier, flexible conduit means extending around said springs and ball-stud and between said carrier and cover, control means mounted in said vehicle and having a tiltable actuator, a plurality of pairs of coaxial cables, the outer cable in each such pair having its ends connected to said cover and control means, and the inner cable in each such pair having one of its ends connected to said actuator and its opposite end projecting through said cover for connection to said carrier, the connections of said inner cables to said actuator having an arcuate spacing with respect to the tilting axis of said plate corresponding to the connections of said inner cables to the carrier with respect to the swivel axis of said carrier.

10. The invention as set forth in claim 9 in which means are provided on said control means for selectively adjusting the length of each of said outer cables between said cover and control means.

11. The invention as set forth in claim 10 in which said means comprises adjusting screws connected to said outer cables and threadably connected to said control means.

12. The invention as set forth in claim 9 in which a plurality of said inner cables extend through said springs for connection to said carrier.

13. A remote control outside rear view mirror assembly, comprising frame means mounted on the outside of a vehicle, a rearwardly open cover supported on said frame means and having a forwardly projecting, rearwardly open recess, a plate mounted in said cover and extending across said recess, a ball-stud mounted on said plate, a carrier swivelly supported on said ball-stud, a mirror fixedly mounted in said carrier, spring means interposed between said carrier and plate urging said carrier away from said plate, control means mounted in said vehicle, and cable means including a first set of cables connected to said control means and to said plate within the extent of said cover recess and a second set of cables connected to said control means and carrier, said second set of cables being moveable upon actuation of said control means to move said carrier and mirror about the axis of said ball-stud.

14. The invention as set forth in claim 13 with the addition that said second set of cables extends through said first set of cables and openings in said plate, at least one of said cables in said second set of cables extending through said spring means for connection to said carrier.

References Cited

UNITED STATES PATENTS

| | | | |
|---|---|---|---|
| 3,096,664 | 7/1963 | Walsh | 74—501 |
| 3,261,226 | 7/1966 | Dent | 74—501 |
| 3,369,427 | 2/1968 | Brighton et al. | 74—501 |
| 3,476,464 | 11/1969 | Clark | 74—501X |

MILTON KAUFMAN, Primary Examiner